(12) United States Patent
Mackey et al.

(10) Patent No.: US 10,311,276 B2
(45) Date of Patent: Jun. 4, 2019

(54) UNDER DISPLAY OPTICAL FINGERPRINT SENSOR ARRANGEMENT FOR MITIGATING MOIRÉ EFFECTS

(71) Applicant: Synaptics Incorporated, San Jose, CA (US)

(72) Inventors: Bob Lee Mackey, San Jose, CA (US); Robert John Gove, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/439,683

(22) Filed: Feb. 22, 2017

(65) Prior Publication Data

US 2018/0239941 A1   Aug. 23, 2018

(51) Int. Cl.
*G06K 9/00*   (2006.01)

(52) U.S. Cl.
CPC ......... *G06K 9/0004* (2013.01); *G06K 9/0008* (2013.01)

(58) Field of Classification Search
CPC ....... G06F 2203/04112; G06F 3/03547; G06F 3/041; G06F 3/0412; G06F 3/0416; G06K 9/00013; G06K 9/0006; G06K 9/58; G06K 9/20; G06K 9/60; G06K 9/00067; G06K 9/0004; G06K 9/0008; A61B 5/1172; G02F 1/13338; G02F 1/134309; G02F 1/13439; G09G 2300/0447; H01L 27/124; H01L 27/14678; H01L 27/323; H01L 27/3234
See application file for complete search history.

(56) References Cited

U.S. PATENT DOCUMENTS

| | | | |
|---|---|---|---|
| 5,446,290 A | 8/1995 | Fujieda et al. | |
| 5,726,443 A | 3/1998 | Immega et al. | |
| 5,991,467 A | 11/1999 | Kamiko | |
| 6,128,399 A | 10/2000 | Calmel | |
| 6,960,788 B2 * | 11/2005 | Joo | H01L 27/1214 257/59 |

(Continued)

FOREIGN PATENT DOCUMENTS

| | | |
|---|---|---|
| CN | 101814125 A | 8/2010 |
| CN | 101814126 B | 8/2010 |

(Continued)

OTHER PUBLICATIONS

International Search Report in PCT/US2018/018690 dated Apr. 27, 2018 (3 pages).

(Continued)

*Primary Examiner* — Kim Y Vu
*Assistant Examiner* — Michael J Vanchy, Jr.
(74) *Attorney, Agent, or Firm* — Leydig, Voit & Mayer, Ltd.

(57) ABSTRACT

A system and method for an electronic device for imaging a biometric object having structural features of interest is disclosed. The electronic device includes a display including rows of pixel elements, the rows of pixel elements being parallel a first primary direction along a first axis and an optical sensor mounted underneath the display, the optical sensor being parallel to a second primary direction along a second axis. The second axis is rotated at an angle relative the first axis to adjust a moiré pattern outside of a frequency range of the features of interest.

20 Claims, 11 Drawing Sheets

(56) References Cited

U.S. PATENT DOCUMENTS

| | | | |
|---|---|---|---|
| 7,465,914 B2 | 12/2008 | Eliasson et al. | |
| 7,535,468 B2 | 5/2009 | Uy | |
| 8,204,283 B2 | 6/2012 | Wu | |
| 8,204,284 B2 | 6/2012 | Wu | |
| 8,259,168 B2 | 9/2012 | Wu et al. | |
| 8,284,119 B2 | 10/2012 | Kim et al. | |
| 8,391,569 B2 | 3/2013 | Wu | |
| 8,520,912 B2 | 8/2013 | Wu et al. | |
| 8,570,303 B2 | 10/2013 | Chen | |
| 8,649,001 B2 | 2/2014 | Wu et al. | |
| 8,798,337 B2 | 8/2014 | Lei et al. | |
| 8,903,140 B2 | 12/2014 | Wu | |
| 8,917,387 B1 | 12/2014 | Lee et al. | |
| 9,052,766 B2 | 6/2015 | Dunphy et al. | |
| 9,177,190 B1 | 11/2015 | Chou et al. | |
| 9,208,394 B2 | 12/2015 | Di Venuto Dayer et al. | |
| 2002/0054394 A1 | 5/2002 | Sasaki et al. | |
| 2003/0090650 A1 | 5/2003 | Fujieda | |
| 2004/0252867 A1 | 12/2004 | Lan et al. | |
| 2006/0152615 A1 | 7/2006 | Kwon et al. | |
| 2008/0121442 A1 | 5/2008 | Boer et al. | |
| 2009/0273577 A1 | 11/2009 | Chen et al. | |
| 2010/0034433 A1 | 2/2010 | Thiebot et al. | |
| 2010/0172552 A1 | 7/2010 | Wu | |
| 2010/0183200 A1 | 7/2010 | Wu | |
| 2010/0204064 A1 | 8/2010 | Cho | |
| 2010/0208952 A1 | 8/2010 | Wu | |
| 2010/0208954 A1 | 8/2010 | Wu | |
| 2010/0283756 A1 | 11/2010 | Ku et al. | |
| 2012/0076370 A1 | 3/2012 | Lei et al. | |
| 2012/0105614 A1 | 5/2012 | Wu et al. | |
| 2012/0242606 A1 | 9/2012 | Mackey | |
| 2012/0321149 A1 | 12/2012 | Carver et al. | |
| 2012/0328170 A1 | 12/2012 | Wu et al. | |
| 2013/0034274 A1 | 2/2013 | Wu et al. | |
| 2013/0051635 A1 | 2/2013 | Wu et al. | |
| 2013/0119237 A1 | 5/2013 | Raguin et al. | |
| 2013/0169780 A1 | 7/2013 | Wu | |
| 2013/0176725 A1 | 7/2013 | Hajjar et al. | |
| 2013/0222282 A1 | 8/2013 | Huang et al. | |
| 2013/0314377 A1* | 11/2013 | Los | G06F 3/0308 345/175 |
| 2014/0125788 A1 | 5/2014 | Wu | |
| 2014/0218327 A1 | 8/2014 | Shi et al. | |
| 2014/0320438 A1 | 10/2014 | Yurlov et al. | |
| 2015/0062088 A1 | 3/2015 | Cho et al. | |
| 2015/0078633 A1 | 3/2015 | Hung | |
| 2015/0187827 A1 | 7/2015 | Tu et al. | |
| 2015/0331508 A1 | 11/2015 | Nho et al. | |
| 2015/0347812 A1 | 12/2015 | Lin | |
| 2015/0347813 A1 | 12/2015 | Tsen | |
| 2015/0369661 A1 | 12/2015 | Lin | |
| 2015/0371074 A1 | 12/2015 | Lin | |
| 2015/0371075 A1 | 12/2015 | Lin | |
| 2016/0170517 A1* | 6/2016 | Donnelly | G06F 3/0412 345/174 |
| 2016/0247010 A1 | 8/2016 | Huang et al. | |
| 2018/0046837 A1* | 2/2018 | Gozzini | G06K 9/0004 |

FOREIGN PATENT DOCUMENTS

| | | |
|---|---|---|
| CN | 102467660 A | 5/2012 |
| CN | 102682280 A | 9/2012 |
| CN | 202443032 U | 9/2012 |
| CN | 102842026 A | 12/2012 |
| CN | 202632318 U | 12/2012 |
| CN | 102915430 A | 2/2013 |
| CN | 102955936 A | 3/2013 |
| CN | 101814126 A | 4/2013 |
| CN | 102682280 B | 6/2013 |
| CN | 103198289 A | 7/2013 |
| CN | 102467660 B | 11/2013 |
| CN | 103810483 A | 5/2014 |
| CN | 103942537 A | 7/2014 |
| CN | 104035620 A | 9/2014 |
| CN | 104063704 A | 9/2014 |
| CN | 203838722 U | 9/2014 |
| CN | 104182727 A | 12/2014 |
| CN | 204028936 U | 12/2014 |
| CN | 104463074 A | 3/2015 |
| CN | 102915430 B | 8/2015 |
| CN | 102842026 B | 9/2015 |
| CN | 102955936 B | 9/2015 |
| EP | 2437201 A2 | 4/2012 |
| EP | 2437201 A3 | 4/2012 |
| EP | 2447883 A1 | 5/2012 |
| EP | 2555137 A1 | 2/2013 |
| EP | 2562683 A1 | 2/2013 |
| JP | 3177550 U | 8/2012 |
| KR | 20120003165 U | 5/2012 |
| KR | 200462271 Y1 | 9/2012 |
| KR | 20130016023 A | 2/2013 |
| KR | 20130022364 A | 3/2013 |
| KR | 101259310 B1 | 5/2013 |
| KR | 101307002 B1 | 9/2013 |
| TW | 201214303 A1 | 4/2010 |
| TW | 201027436 A1 | 7/2010 |
| TW | 201032145 A1 | 9/2010 |
| TW | 201115479 A1 | 5/2011 |
| TW | M435680 U1 | 2/2012 |
| TW | 201301144 A1 | 1/2013 |
| TW | I382349 B1 | 1/2013 |
| TW | I382350 B1 | 1/2013 |
| TW | I450201 B | 2/2013 |
| TW | 201310353 A1 | 3/2013 |
| TW | 201329872 A1 | 7/2013 |
| TW | 201419165 A | 5/2014 |
| TW | I444904 B | 7/2014 |
| TW | I448973 B | 8/2014 |
| TW | I457842 B | 10/2014 |
| TW | 201441940 A | 11/2014 |
| TW | I456510 B | 12/2014 |
| TW | 201308215 A1 | 2/2015 |
| TW | 201506807 A | 2/2015 |
| WO | WO 2015/041459 A1 | 3/2015 |
| WO | WO 2015/140600 A1 | 9/2015 |

OTHER PUBLICATIONS

International Written Opinion in PCT/US2018/018690 dated Apr. 27, 2018 (7 pages).

Rowe et al. "Multispectral Fingerprint Image Acquisition" Springer, New York, USA, 2008 pp. 3-23.

VKANSEE Presentation prior to Sep. 30, 2015.

Cho, et al, "Embedded Nano-Si Optical Sensor in TFT-LCDs Technology and Integrated as Touch-Input Display" *Digest of Technical Papers.* vol. 42. No. 1., 2011, pp. 1818-1821.

Brown, et al., "A Continuous-Grain Silicon-System LCD With Optical Input Function" IEEE Journal of Solid-State Circuits, Dec. 12, 2007, vol. 42.

Atpina Technology White Paper "An Objective Look at FSI and BSI" May 18, 2010, 6 pages.

Durini, "High Performance Silicon Imaging: Fundamentals and Applications of CMOS and CCD Sensors" *Woodhead Publishing Series in Electronic and Optical Materials* 1$^{st}$ edition; May 8, 2014, pp. 98-107.

\* cited by examiner

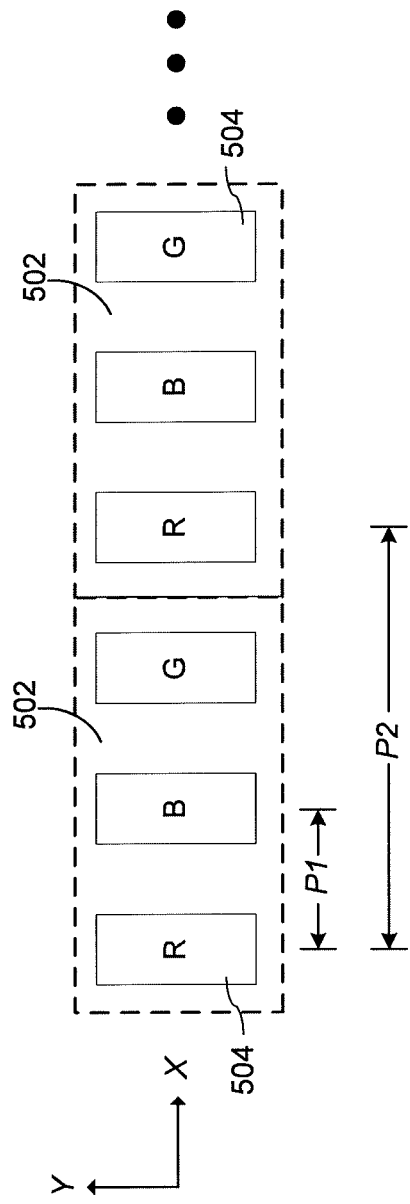

UNDER DISPLAY OPTICAL FINGERPRINT SENSOR ARRANGEMENT FOR MITIGATING MOIRÉ EFFECTS

FIELD

This disclosure generally relates to optical sensors, and more particularly to an under display optical fingerprint sensor arrangement that mitigates moiré effects.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices.

Optical fingerprint sensors provide an alternative to capacitive fingerprint sensors. More recently, efforts have been made to try to implement optical fingerprint sensors in the active area of a display, for example, under the display of a mobile device. Display components, e.g. pixels and sub-pixels, will generally have a periodicity to them resulting from repetition of the display components. Likewise, individual optical sensor elements on the optical sensor, which may be mounted below the display, will have their own periodicity. The combined periodicity of the optical sensor elements and display components may result in a moiré effect causing portions of the fingerprint image to have areas of light and dark, which can in turn interfere with analyzing fingerprint features, such as ridges and valleys.

SUMMARY

One embodiment provides an electronic device for imaging a biometric object having structural features of interest. The electronic device includes a display having rows of pixel elements, the rows of pixel elements being parallel to a first primary direction along a first axis; and an optical sensor disposed underneath the display, the optical sensor being parallel to a second primary direction along a second axis. The second axis has an angle relative the first axis and wherein the angle adjusts a moiré pattern frequency outside of a frequency range corresponding to the structural features of interest.

Another embodiment provides an electronic device. The electronic device includes a display having rows of pixel elements parallel to a first primary axis; and an optical sensor having rows of sensing elements parallel to a second primary axis, the optical sensor configured to image a fingerprint. The optical sensor is disposed underneath the display and orientated such that the second primary axis is rotated relative to the first primary axis at an angle $\Theta$, the angle $\Theta$ being sufficient to reduce moiré effect on images when imaging the fingerprint.

Yet another embodiment provides a method for determining an angle to mount an optical sensor relative to a display to mitigate moiré patterns. The method includes determining a frequency of components of the display; determining a frequency of components of the optical sensor; determining a frequency of moiré patterns; and determining the angle based on the frequency of the components of display and the frequency of the components of the sensor, wherein the angle adjusts the frequency of the moiré patterns.

BRIEF DESCRIPTION OF THE DRAWINGS

FIGS. 5A-5B illustrate examples of display pixel and sub-pixel arrangements.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

An optical fingerprint sensor for use under a display is described. The display has periodic structures corresponding to a pitch of individual display pixels and sub-pixels. The optical fingerprint sensor also has periodic structures corresponding to a pitch of individual sensor pixels or elements. One solution is to design the optical fingerprint sensor so all sensor elements fall directly underneath openings in the display, e.g., areas of the display unoccupied by display pixels. However, it is difficult to design a sensor that is perfectly matched to openings in the display. The problem becomes even more complex when an attempt is made to design an optical sensor that may be used with a variety of displays having different geometries and structural characteristics. Where the fingerprint sensor is not perfectly matched to the openings in the display, a moiré pattern can occur in any resulting fingerprint image. The amount of degradation to the fingerprint image is particularly problematic when the frequency of the moiré pattern is on the same order of magnitude as the frequency of features of interest, such as fingerprint ridges and valleys.

The optical fingerprint sensor described herein is designed to mitigate moiré effect by adjusting the angle or rotation of the sensor elements relative to the display pixels so that spatial frequencies of the moiré pattern do not interfere with the fingerprint image. By adjusting the angle of rotation, the disclosed fingerprint sensor reduces the moiré effect amplitudes and/or results in moiré frequencies that are outside the range of interest. The specific angle of rotation can vary and depends on the periodicity of display structures (e.g., pixels, sub-pixels, electrodes, etc.) and optical sensor structures (e.g., sensor elements, and optical elements such as collimators).

Figure 1:
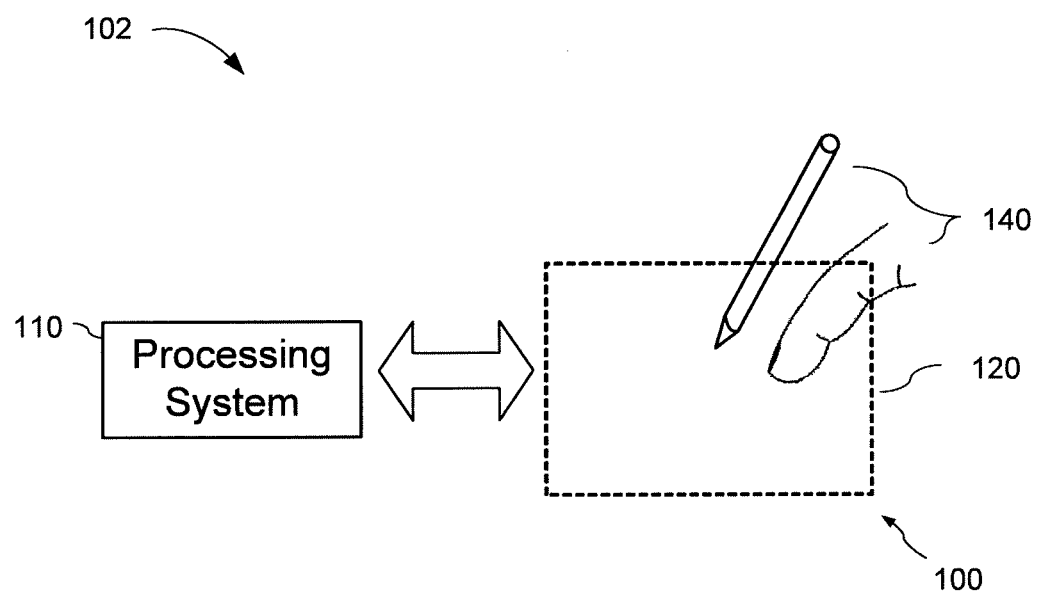
FIG. 1 is a block diagram of an exemplary input device.

Turning to the drawings, FIG. 1 is a block diagram of an exemplary electronic device 102 having a sensor 100. The sensor 100 may be configured to provide input to an electronic system (also "electronic device"). It will be understood that the sensor 100 is described as an optical biometric sensor (e.g., fingerprint sensor) mounted under a display. The display may include other sensors, such as a touch sensor, which may employ any suitable sensing technology including without limitation capacitive or optical sensing technology.

Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Indeed, the disclosure contemplates any electronic device or system having an optical sensor under a display. As appropriate, the sensor 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

The sensor 100 is configured to sense input provided by one or more input objects 140 in a sensing region 120. In one embodiment, the input object 140 is a finger, and the sensor 100 is implemented as a fingerprint sensor (also "fingerprint scanner") configured to detect fingerprint features of the input object 140. In other embodiments, the sensor 100 may be implemented as vascular sensor (e.g., for finger vein recognition), hand geometry sensor, or a proximity sensor (such as a touch pad, touch screen, and or other touch sensor device). Thus, the sensor 100 is more broadly understood to be a biometric sensor.

Sensing region 120 encompasses any space above, around, in, and/or near the sensor 100 in which the sensor 100 is able to detect input (e.g., user input provided by one or more input objects 140). The sizes, shapes, and locations of particular sensing regions may vary widely from embodiment to embodiment. In some embodiments, the sensing region 120 extends from a surface of the sensor 100 in one or more directions into space. In various embodiments, input surfaces may be provided by surfaces of casings within which sensor elements reside, by face sheets applied over the sensor elements or any casings, etc. In some embodiments, the sensing region 120 has a rectangular shape when projected onto an input surface of the input device. The sensing region 120 may include the entire area of a display or only a portion of the display.

The sensor 100 comprises one or more optical detector elements (or "sensing elements") for detecting user input and imaging an input object. Some implementations utilize arrays or other regular or irregular patterns of sensing elements to detect and image the input object 140. One or more detector elements detect light from the sensing region. In various embodiments, the detected light may be reflected from input objects in the sensing region, emitted by input objects in the sensing region, or some combination thereof. Example optical detector elements include photodiodes, CMOS arrays, CCD arrays, photodiodes, and other types of photosensors configured to detect light in the visible or invisible spectrum (such as infrared or ultraviolet light). The photosensors may also be thin film transistors (TFTs) or thin film diodes (TFDs).

Some optical implementations provide illumination to the sensing region. Light reflected or scattered from the sensing region in the illumination wavelength(s) are detected to determine input information corresponding to the input object. Illumination of the sensing region may be provided by display pixels (e.g., OLEDs), backlighting, or a separate light source.

Some optical implementations rely on principles of direct illumination of the input object, which may or may not be in contact with an input surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

Some optical implementations rely on principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. An example of this is the presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflection of the incident light differs depending on whether a ridge or valley is in contact with that portion of the input surface.

Some implementations are configured to provide images that span one, two, three, or higher dimensional spaces. The input device may have a sensor resolution that varies from embodiment to embodiment depending on factors such as the particular sensing technology involved and/or the scale of information of interest. The sensor 100 is implemented as a fingerprint sensor having a sensor resolution high enough to capture features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of 0.1 mm or less is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 0.05 mm or less is capable of reliably capturing these higher level features.

In some embodiments, the fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 mm$^2$ or less. In another exemplary embodiment, a partial placement sensor has an imaging area in the range of 20-50 mm$^2$. In some implementations, the partial fingerprint sensor has an input surface that is the same size as the imaging area.

While the input device is generally described in the context of a fingerprint sensor in FIG. 1, embodiments of the present disclosure include other biometric sensor devices. In various embodiments, a biometric sensor device may be configured to capture physiological biometric characteristics of a user. Some example physiological biometric characteristics include fingerprint patterns, vascular patterns (sometimes known as "vein patterns"), palm prints, and hand geometry. Moreover, the described embodiments apply to any optical sensor which may be disposed underneath a display, e.g., sensing region on top of the display with the optical sensor being mounted or disposed under the display.

In FIG. 1, a processing system 110 is shown in communication with the sensor 100. The processing system 110 comprises parts of or all of one or more integrated circuits (ICs) and/or other circuitry components. In some embodiments, the processing system may be configured to operate hardware of the input device to capture input data, and/or implement a biometric process or other process based on input data captured by the sensor 100.

In some implementations, the processing system 110 is configured to operate sensor hardware of the sensor 100 to detect input in the sensing region 120. In some implementations, the processing system comprises driver circuitry configured to drive signals with sensing hardware of the input device and/or receiver circuitry configured to receive signals with the sensing hardware. For example, a processing system for an optical sensor device may comprise driver circuitry configured to drive illumination signals to one or more LEDs, an LCD backlight or other light sources, and/or receiver circuitry configured to receive signals with optical sensing elements.

In some embodiments, the processing system 110 comprises electronically-readable instructions, such as firmware code, software code, and/or the like. In some embodiments, the processing system 110 includes memory for storing electronically-readable instructions and/or other data, such as reference templates for biometric recognition. The processing system 110 can be implemented as a physical part of the sensor 100, or can be physically separate from the sensor 100. The processing system 110 may communicate with parts of the sensor 100 using buses, networks, and/or other wired or wireless interconnections. In some embodiments, components composing the processing system 110 are located together, such as near sensing element(s) of the sensor 100. In other embodiments, components of processing system 110 are physically separate with one or more components close to sensing element(s) of sensor 100, and one or more components elsewhere. For example, the sensor 100 may be a peripheral coupled to a computing device, and the processing system 110 may comprise software configured to run on a central processing unit of the computing device and one or more ICs (perhaps with associated firmware) separate from the central processing unit.

As another example, the sensor 100 may be physically integrated in a mobile device, and the processing system 110 may comprise circuits and/or firmware that are part of a central processing unit or other main processor of the mobile device. In some embodiments, the processing system 110 is dedicated to implementing the sensor 100. In other embodiments, the processing system 110 performs functions associated with the sensor and also performs other functions, such as operating display screens, driving haptic actuators, running an operating system (OS) for the electronic system, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensing elements, electrodes and display screens, data processing modules for processing data such as sensor signals and positional information, and reporting modules for reporting information. Further example modules include sensor operation modules configured to operate sensing element(s) to detect input and/or image an input object, identification modules configured to identify gestures such as mode-changing gestures, and mode-changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include unlocking a device or otherwise changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode-changing actions and GUI actions.

In some embodiments, the processing system 110 operates the sensing element(s) of the sensor 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor elements. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, authenticate a user, and the like.

As noted, the sensing region 120 of the sensor 100 overlaps at least part of an active area of a display screen. The display screen may be any type of dynamic display capable of displaying a visual interface to a user, for example, an organic LED (OLED) display. Of course, it will be understood that the described embodiments can be used with other types of displays that are transparent or partially transparent. The display screen may also be flexible or rigid, and may be flat, curved, or have other geometries. In some embodiments, the display screen includes a glass or plastic substrate for TFT circuitry and/or other circuitry, which may be used to provide visuals and/or provide other functionality. In some embodiments, the display device includes a cover lens (sometimes referred to as a "cover glass") disposed above display circuitry which may be optically clear and also provide an input surface for the input device. Example cover lens materials include amorphous glass (which may be chemically hardened), sapphire, and plastic.

Figure 2:
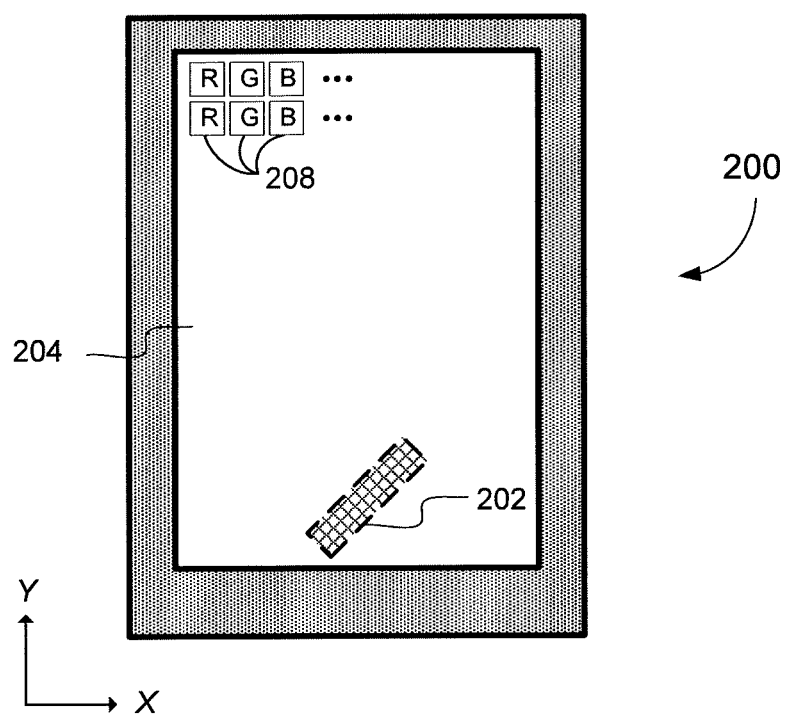
FIG. 2 is a block diagram of an electronic device having an optical sensor integrated within an active display area.

FIG. 2 is a block diagram illustrating an exemplary electronic device 200 (e.g., a mobile device, such as a smartphone or tablet) having both a display 204 and an optical biometric (e.g., fingerprint) image sensor 202. The display 204 includes various pixels and sub-pixels (e.g., red, green, blue) 208, which are illustratively shown, but not to scale. The pixels and sub-pixels are generally arranged in rows and column, along the X axis and Y axis, respectfully. The biometric sensor 202 includes an array of sensing elements and is integrated with the display 204, e.g., mounted or otherwise disposed under display pixels, such that the biometric sensor 202 overlaps with the display 204. Although the fingerprint sensor 202 is shown as occupying only a portion of an area of the display 204, it will be appreciated that the biometric sensor 202 may cover an area that is generally coextensive with the area of the display 204. As described in further detail herein, the biometric sensor 202 is adjusted (e.g., rotated) at an angle Θ relative to the display to reduce moiré effects.

Figure 3:
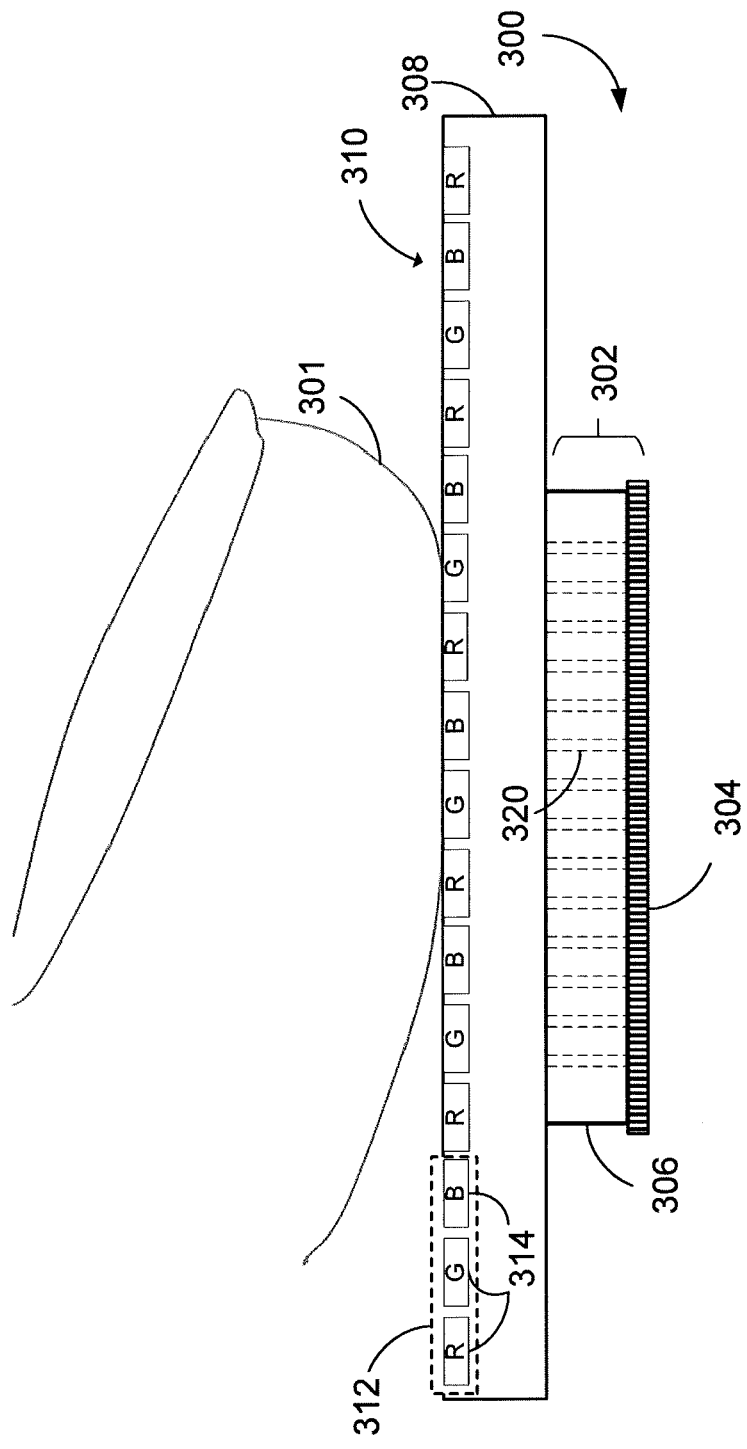
FIG. 3 is a block diagram illustrating a side view of an example of an electronic device having an optical sensor integrated within an active display area.

FIG. 3 illustrates an example of a stack-up for a biometric optical image sensor device 300 used to acquire an image of a biometric object 301, such as a fingerprint. The image sensor device 300 includes an optical sensor 302. The optical sensor 302 includes an array of sensing elements 304, and an optional optical element or light conditioning layer 306 disposed above the array of sensing elements 304. The optical sensor 302 is mounted or otherwise disposed underneath a display 308. It will be understood that the stack-up is shown in simplified form and that other layers and/or components may be included. As but a few examples, a cover layer (e.g., cover glass or cover lens) may be provided above the display, and various filters, adhesives etc. may be interposed between layers. Moreover, the exact layers will vary depending on the display technology used, such as OLED, LCD and the like.

A sensing region for the input object 301 is shown above the display 308. A top surface 310 may form a sensing surface, which provides a contact area for the input object 301 (e.g., fingerprint). The display 308 includes an array of pixels 312 used to render graphics, text, and the like visible to a user. Each pixel 312 may be further broken down into sub-pixels 314, e.g. red, green and blue sub-pixels, which may be arranged in variety of patterns, e.g., linear, rectangular, triangular, striped, diagonal, PenTile.

Although generally described in the context of fingerprint (or other biometric) for illustrative purposes, the input object 301 may be any object to be imaged. Generally, the object 301 will have various features. By way of example, the object 301 has ridges and valleys. Due to their protruding nature, the ridges contact the sensing surface 310. In contrast, the valleys do not contact the sensing surface 310 and instead form an air gap between the input object 301 and the sensing surface 310. In the case of fingerprints, for example, the frequency of ridges is in the range of about 2 to 3/mm, which features can be detected and optically imaged using the array of sensing elements 304. Other features such as pores, minutia, etc. may be imaged and which likewise have a corresponding spatial frequency range.

The array of sensing elements 304 detects light from the input object 301. A non-limiting example of a suitable sensor arrays is a complementary metal oxide semiconductor (CMOS) sensor arrays, although the system and method contemplate any suitable sensor array. The array of sensing elements 304 includes a plurality of individual optical sensing elements capable of detecting the intensity of incident light. The sensing elements form the array of sensing elements 304, which may be a regular (e.g., rectangular array) or irregular pattern. An example of a sensor pitch would be on the order 1 μm to 200 μm, with a corresponding spatial frequency of 1,000/mm to 5/mm.

To achieve optical sensing of fingerprints and fingerprint-sized features, light reflected from the fingerprint may be conditioned by the optical element 306, which may for example be a collimator, color filter, polarizer, or other light conditioning element, so that the light reaching each sensing element in the array of sensing elements 304 comes only from a small spot on the input object 301 directly above the sensor element, e.g., normal or near normal to a plane defined by the array of sensing elements 304. In general, the optical element 306 may be provided with an array of apertures, or collimator holes, 320 with each aperture being directly above one or more optical sensing elements on the array of sensing elements 304. The pitch of apertures may, for example, be on the order of 50 μm which corresponds to a spatial frequency of about 20/mm.

As described further below, a primary direction or orientation of the optical sensor 302 (e.g., axis of rows or columns of sensing elements) is rotated relative to a primary direction of the display 308 (e.g., axis of rows or columns of pixel elements) to reduce the moiré effect. Such rotation may include rotating the array of sensing elements 304 relative to the display 308, rotating the optical element 306 (if provided) relative to the display 308 or rotating both the array of sensing elements 304 and optical element 306. The extent of rotation of the optical element 306 and/or array of sensing elements 304 depends on their respective periodicity as compared to the periodicity of the display components, the resultant moiré frequency and the extent to which the resultant moiré frequency interferes with imaged structural features of interest, such as fingerprint ridges valleys, pores, minutia etc.

Figure 4A:
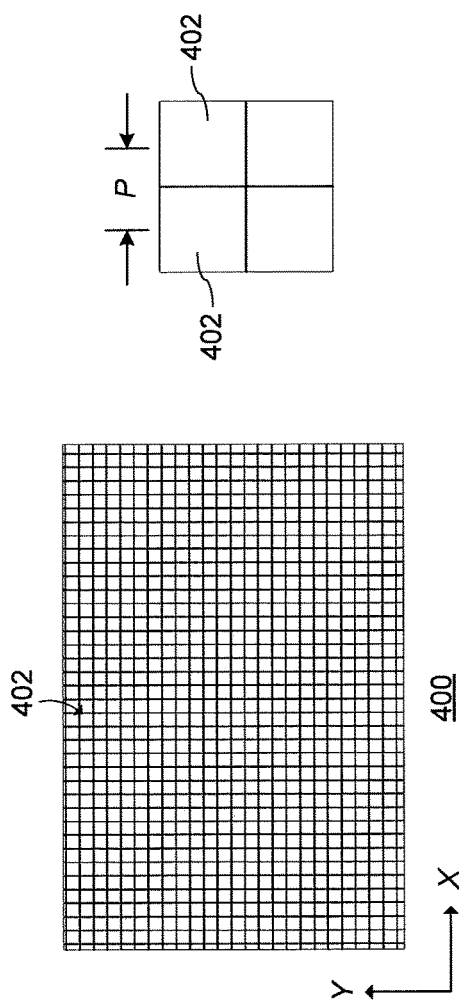
FIGS. 4A-4C illustrate examples of top views of an optical sensor array, and optical element arrangements.
Figure 4C:
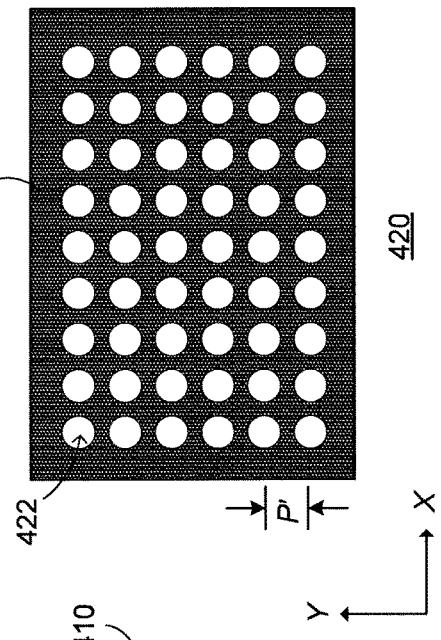
Figure 4B:
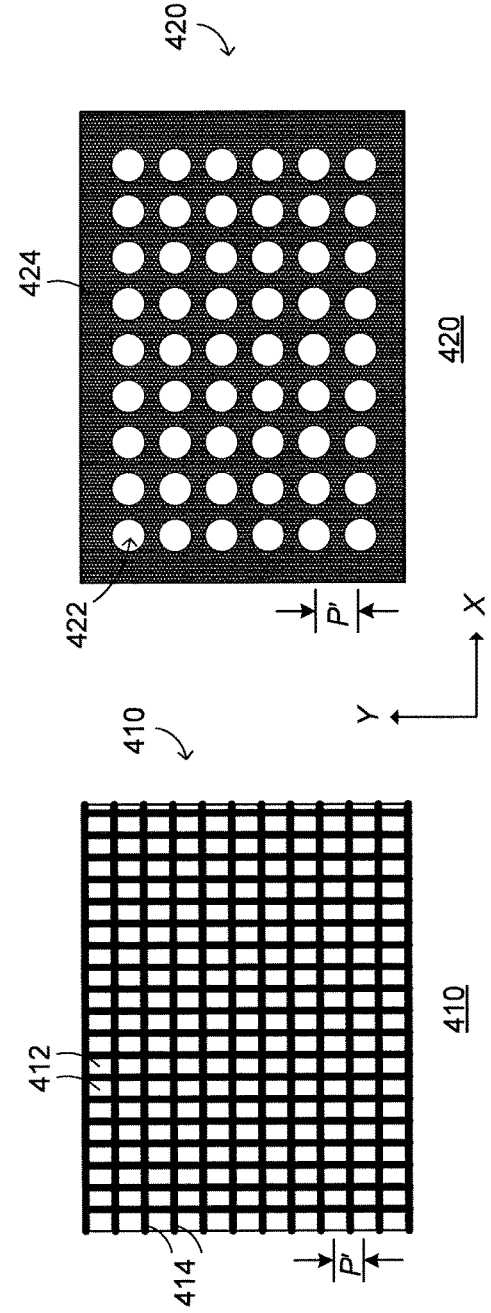

FIGS. 4A-4C illustrate plan views of various sensor 302 (FIG. 3) components. As described below, the sensors 302 have a periodicity. As noted in connection with FIG. 3, the optical sensor 302 may include an optical element and an array of sensing elements. The periodicity of the sensing elements may be the same or different from the optical element.

FIG. 4A illustrates an array of sensing elements 400, which includes rows and columns of individual sensing elements 402. In the example, the rows are parallel to the X axis and the columns are parallel to the Y axis. Although the array of sensing elements 400 is shown as a regular pattern of rows and columns (e.g., rectangular), the sensing array 400 may be implemented as an irregular pattern. Moreover, although the individual sensing elements 402 are shown more or less immediately adjacent to each other, the sensing elements 402 may be spaced part. Further, although the sensing elements 402 are shown as having a rectangular cross section, the cross section may be any geometry. In general, however, the individual sensing elements 402 are spaced apart by a distance P, which represents a pitch or spatial period of the sensing array. The spatial frequency (f) of the sensing elements is thus the reciprocal of P or 1/P. Although the sensing elements in FIG. 4A are shown as forming a rectangular array, other regular or irregular patterns may be used, e.g., linear, triangular, PenTile.

FIGS. 4B-4C illustrate examples of optional optical elements, e.g. 306 as described in connection with FIG. 3. As described, the optical elements may be used to provide light conditioning to reduce image blurring. In the specific embodiments shown in FIGS. 4B-4C, the optical elements are collimators, although other light conditioners such as color filters or polarizing films may be used. In FIG. 4B, the collimator includes a rectangular array of apertures 412 formed by sidewalls 414. The sidewalls 414 may be formed of light absorbing or light occluding material. The apertures 412 may be air gaps or filled with a transparent or semi-transparent material. In FIG. 4C, the collimator has an array of apertures 422 having a circular cross section formed by openings in light blocking or occluding material 424. As with the case of the sensing elements (FIG. 4A), the array of apertures shown in FIGS. 4B-4C may form a regular or irregular pattern and generally follow rows along the X axis and columns along the Y axis. As further shown, each individual optical element (e.g., collimator opening) has a spatial periodicity or pitch (P') and corresponding spatial frequency (f'). Although the apertures in FIGS. 4B-4C are shown as forming a rectangular array, other regular or irregular patterns may be used.

Figure 5B:
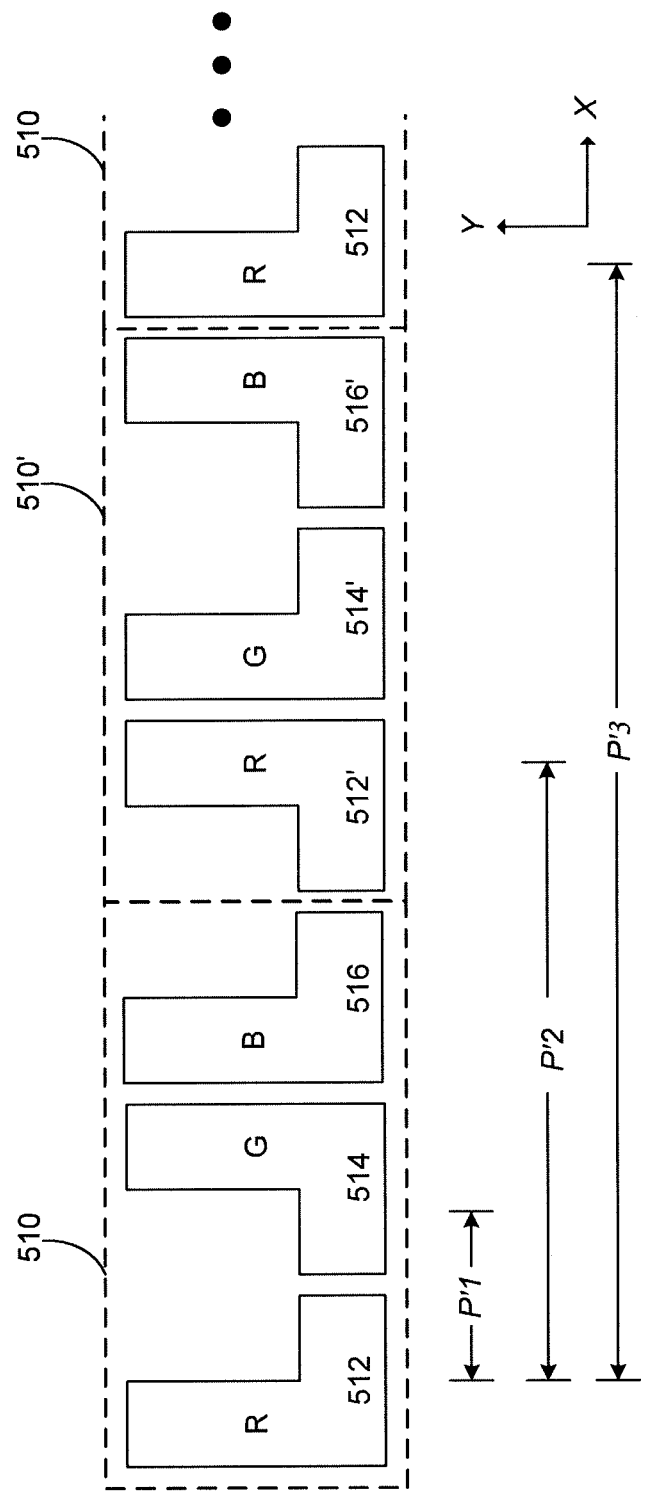

FIGS. 5A-5B illustrate various examples of arrangements of display pixels and sub-pixels of a display. As shown in FIG. 5A, the pixels generally extend in a linear fashion forming rows with each pixel 502 having, for example, red, green and blue sub-pixels 504. Of course, the display will typically have multiple rows of pixels. A first periodicity (P1) and frequency (1/P1) is defined by the distance between adjacent sub-pixels 504. A second periodicity (P2) and frequency (1/P2) is defined by the distance between adjacent pixels 502. Each of these periods is relevant for analyzing the moiré effect and thus, the rotation to be applied to the sensor relative to the display.

Assuming, for example, the distance between each pixel is 60 μm and assuming the distance between sub-pixels is 20 μm, both periods 60 μm and 20 μm (and corresponding frequencies of about 16-17 pixels/mm and 50 sub-pixels/mm) are relevant for purposes of analyzing potential moiré patterns.

FIG. 5B illustrates yet another example of a display pixel pattern. In this example, the distance between adjacent display sub-pixels (e.g., distance between red sub-pixel 512 and green sub-pixel 514) is P'1 with the distance between adjacent display pixels (e.g., 510 and 510') being P'2. Each of P'1 and P'2 form a periodicity to be considered with respect to the moiré effect. However, in the example, each adjacent pixel (e.g., 510 and 510') is not identical to the immediately adjacent pixel, but rather includes sub-pixels that are mirror images of one another. For example, red sub-pixel 512 of pixel 510 is a mirror image of sub-pixel 512' of pixel 510'. Thus, an additional periodicity P'3 exists, which is the distance before a given sub-pixel color repeats in a non-mirror imaged form.

It will be understood that the display pixels illustrated are shown in simplified form. The display pixels may include other structures, such as electrodes which may further add the periodicity of the display. Moreover, the particular arrangements shown are by way of example. Any layout of pixels and sub-pixels may be used (e.g., linear, rectangular, triangular, PenTile, etc.) with each layout including periodicities that are considered in determining an appropriate angle of rotation. The particular layout of pixels and sub-pixels and optical sensor elements is not critical, so long as the periodicity of the structure are considered in mitigating the moiré effect resulting from positioning and adjustment (e.g., rotation) of the sensor relative to the display.

Figure 6:
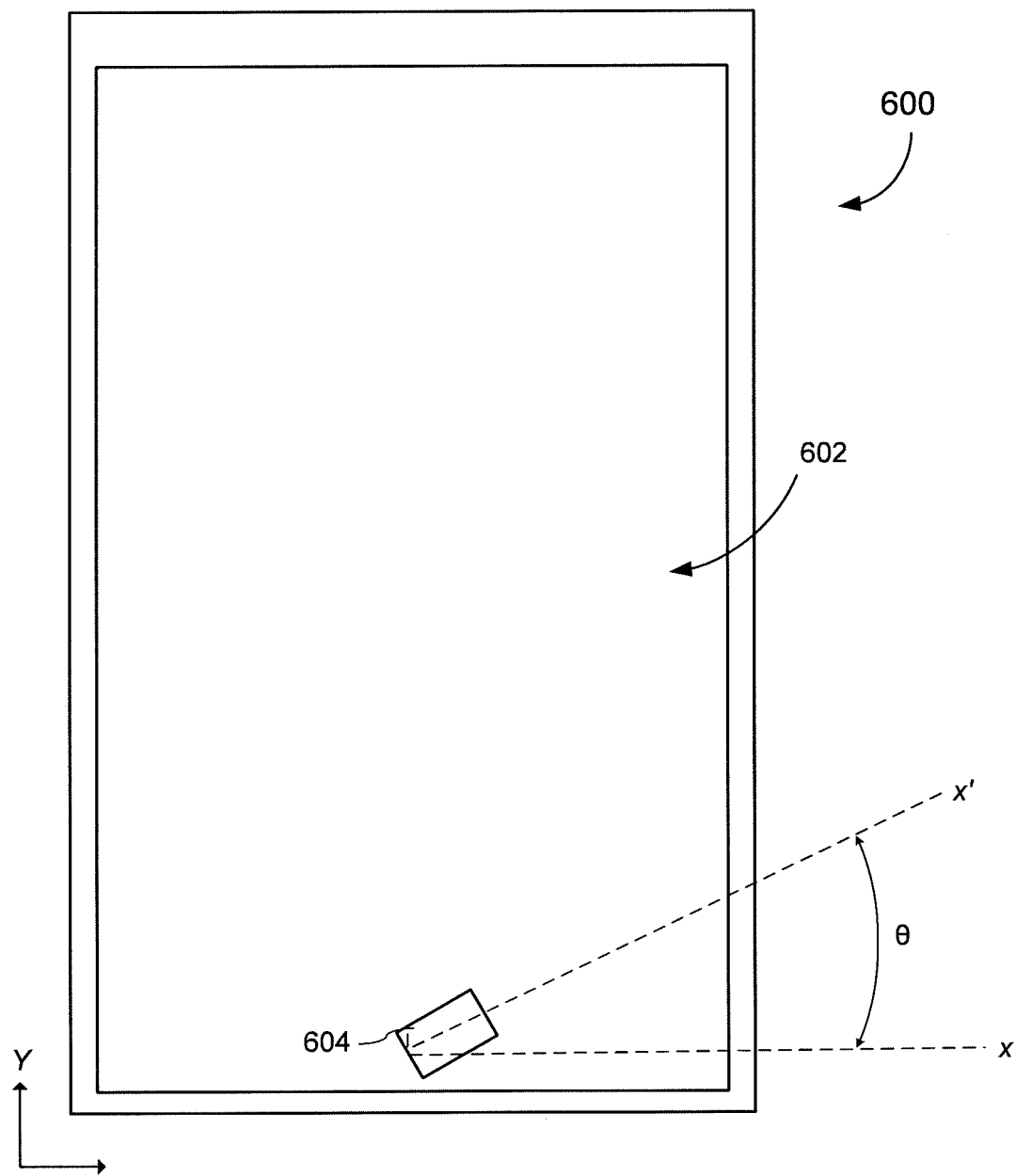
FIG. 6 is a block diagram of an electronic device having an optical sensor integrated within an active display area with angular adjustment to mitigate moiré effects.

FIG. 6 illustrates an electronic device 600 (such as a mobile phone) with a display 602 and an optical sensor 604 mounted underneath the display. As shown, the electronic device 600 and display 602 include an axis (or direction) along axis X and an axis along the Y axis. The X axis generally represents the direction of display pixel rows (e.g., pixel rows are parallel to the X axis), while the Y axis generally represents display pixel columns. For ease of reference, the X axis (direction of display pixel rows) will be referred to as the primary direction of the display. The optical sensor 604 is mounted along an axis (or direction) X', meaning rows of sensing elements on the optical sensor 604 are parallel to the X' axis. For ease of reference, the X' axis (direction of the sensing element rows) is referred to as the primary direction of the sensor. As shown, an angle Θ exists between the X axis and X axis. The angle is selected to mitigate the moiré effect.

The angle Θ selected will depend on the periodicity of the optical sensor and display. With respect to the sensor, the periodicity of both any optical element (e.g., collimator) and of the sensor elements are considered. In addition, the periodicity of the display may involve consideration of multiple periodicities, e.g., the periodicity of each sub-pixel, pixel, and any other repeating structural features, such as electrodes. The primary consideration is to avoid moiré patterns from occurring at spatial frequencies near spatial frequencies corresponding to features of interest. For example, in the case of fingerprint ridges, moiré patterns in the range of 2-5/mm are to be avoided. Moiré frequencies orders of magnitude above or below the frequencies of interest may be present without substantially impacting the quality of the fingerprint image.

As a simple example, consider a display having a single frequency $f_1$ (e.g., pixels/mm) and an array of sensing elements having a single frequency $f_2$ (e.g., sensing elements/mm). Further, assume that it is desired to optically acquire images of fingerprints having a ridge pitch spatial frequency of about 2-3 lines/mm. Moiré frequencies resulting from any non-rotated array of sensing elements and display pixels would result in moiré frequencies at $f_1 \pm f_2$. If the moiré frequencies are on the order of magnitude of frequencies corresponding to the features of interest (2-3/mm), significant interference with fingerprint imaging may occur. Thus, according to the method and system described herein, the optical sensor (e.g., array of sensing elements and/or optical element) are rotated at angle Θ, with Θ being selected such that the moiré frequencies can be sufficiently mitigated, e.g. moiré frequencies are increased or decreased sufficiently above or below the frequencies corresponding to structural features of interest. For example, with fingerprints having a frequency of about 2-3/mm, moiré frequencies less than 1/mm or greater than 10-20/mm may be sufficient.

Figure 7:
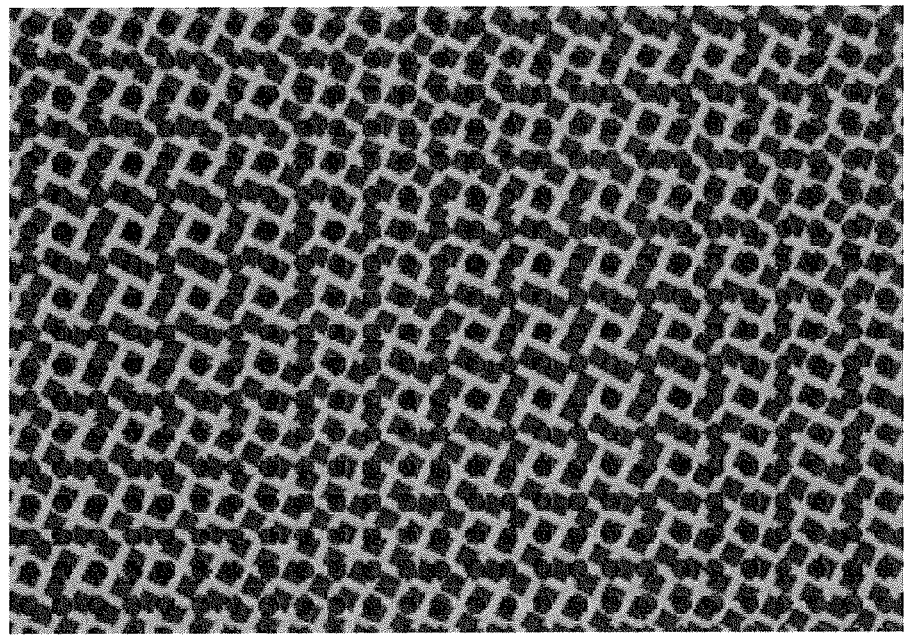
FIG. 7 illustrates images from optical sensors integrated within an active display with and without sensor adjustment.
Figure 7:
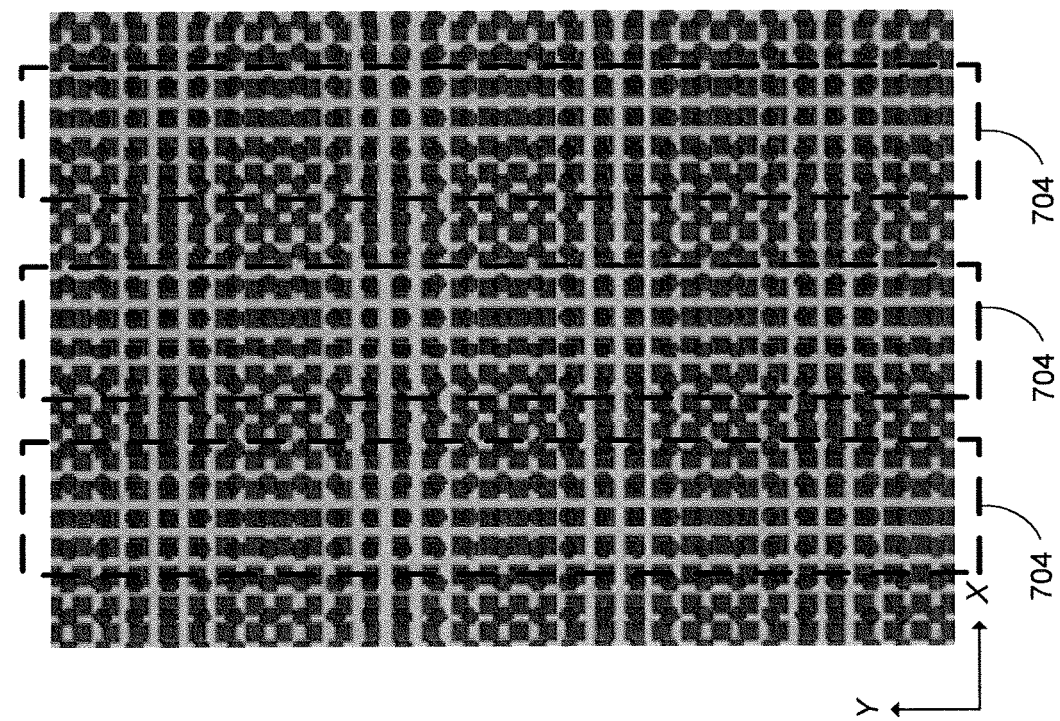
Figure 8:
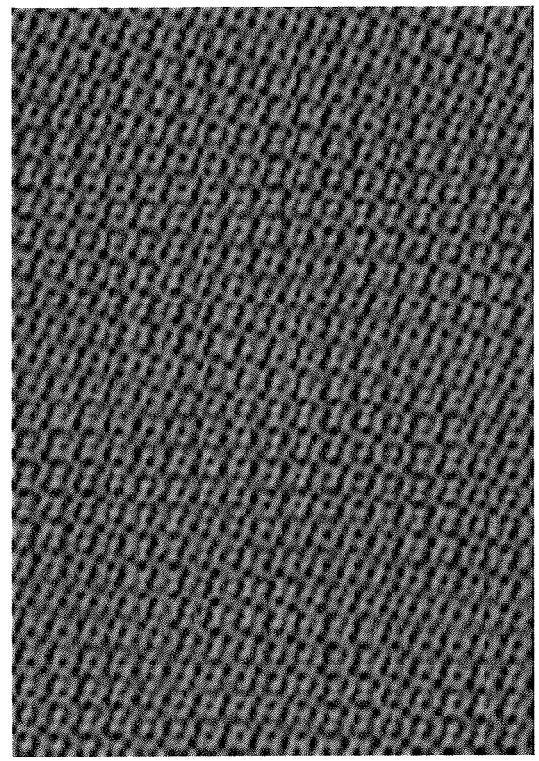
FIG. 8 illustrates images from optical sensors integrated within an active display with and without sensor adjustment.
Figure 8:
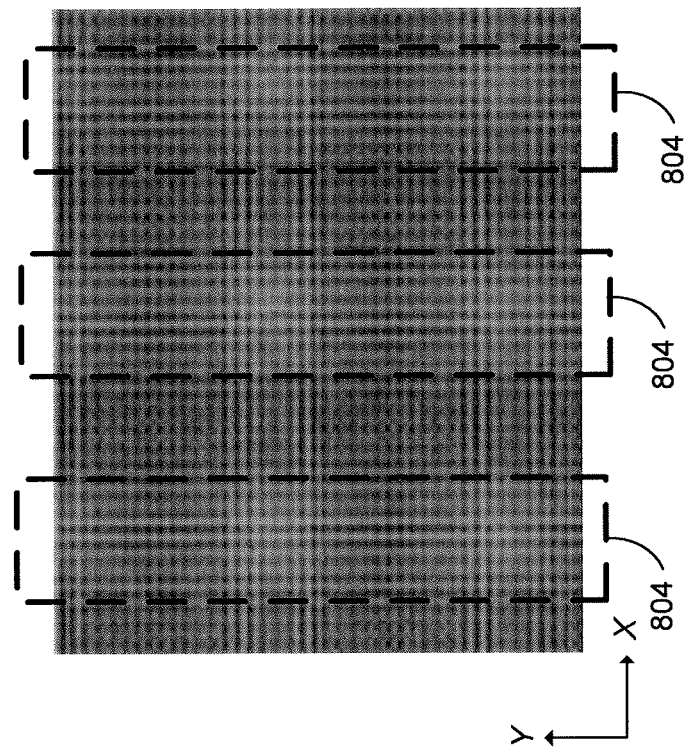

Specific examples are shown in connection with FIGS. 7-8. For example, FIG. 7 illustrates the result of an optical sensor mounted under a display both without rotation (left) and with rotation (right) of the optical sensor relative to the display. The specific example includes a display having a pixel pitch of 44 μm and an optical sensor having a pitch of 50.8 μm. Without the sensor rotated relative to the display, the moiré pattern has a frequency of about 3/mm as shown by the dashed boxes labeled 704. The example on the right illustrates the resultant when the primary direction of the sensor is rotated at an angle of about 26 degrees relative to the primary direction of the display, e.g., about 26 degrees from horizontal in the orientation shown. It is noted that the example on the right still has a moiré pattern; however, the pattern is on the order of 10/mm and, thus, is significantly outside of the range of the spatial frequency of fingerprint ridges.

FIG. 8 illustrates a display having a pixel pitch of 48 μm and an optical sensor having a pitch of 50.8 μm. In the example on the left, the sensor was not rotated relative to the display causing a moiré pattern depicted by dashed boxes 804 on the order of 1/mm, which again is close to the fingerprint frequency of interest. In the example on the right, the sensor was again rotated to about 26 degrees relative to the display. In the rotated design shown on the right, the moiré pattern has a high frequency pattern (approx. 10/mm), which provides sufficient mitigation of the moiré pattern.

It will be appreciated that specific examples of display and sensor pitch and rotation angles have been provided to illustrate the method and system described herein. The system and method can be used with any display and sensor pitch, and any angle of rotation may be used provided the angle gives appropriate level of mitigation to moiré effect. The appropriate level will vary depending on the particular application; however, will generally be sufficient to accurately image and analyze features of interest of the input object (e.g., ridges and valleys in the case of a fingerprint). Examples of angles of rotation are 26-27 degrees, 20-30 degrees, 10-40 degrees, and 1 to 90 degrees.

Figure 9:
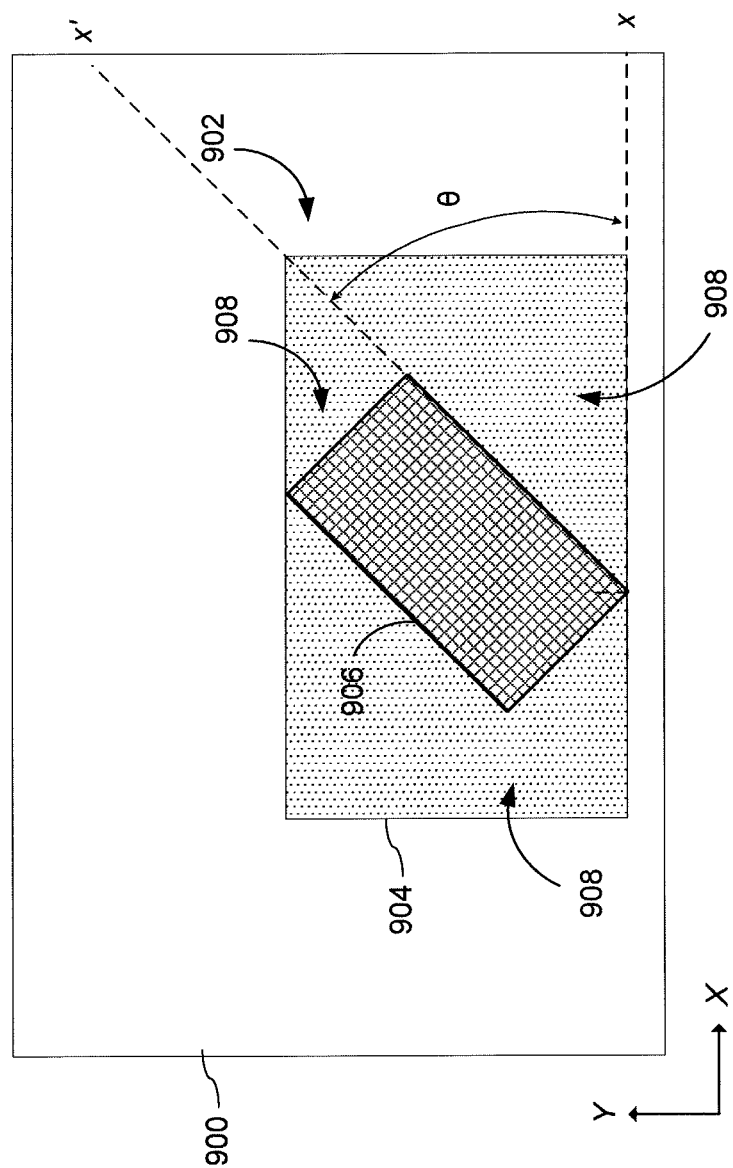
FIG. 9 illustrates an alternative embodiment of a sensing element angularly formed on a die.

FIG. 9 illustrates an alternative optical sensor arrangement as compared to FIG. 6. In the embodiment of FIG. 9, an electronic device having a display 900 includes an optical sensor 902. The optical sensor 902 includes an optical sensor die 904 and an array of sensing elements 906. It will be noted that the display 900 and sensor die 904 are not rotated relative to the X axis, e.g., the primary axis of the display 900 and sensor die 904 are the same and parallel to the X axis. However, the array of sensing elements 906 are formed in the sensor die, such that the array of sensing elements are parallel to the X' axis with the X' axis having an angle Θ relative to the X axis thereby creating desired rotation between the array of sensing elements 906 and display 900 to mitigate moiré patterns.

It will further be noted that the die (e.g. silicon die) includes areas 908 unoccupied by the array of sensor elements 906, with the unoccupied areas 908 being a significant portion of the sensor die 904 as generally shown. Such unoccupied areas may be used to implement sensor circuitry for controlling the sensing elements, e.g., turning elements on and off, processing data, and the like.

Figure 10:
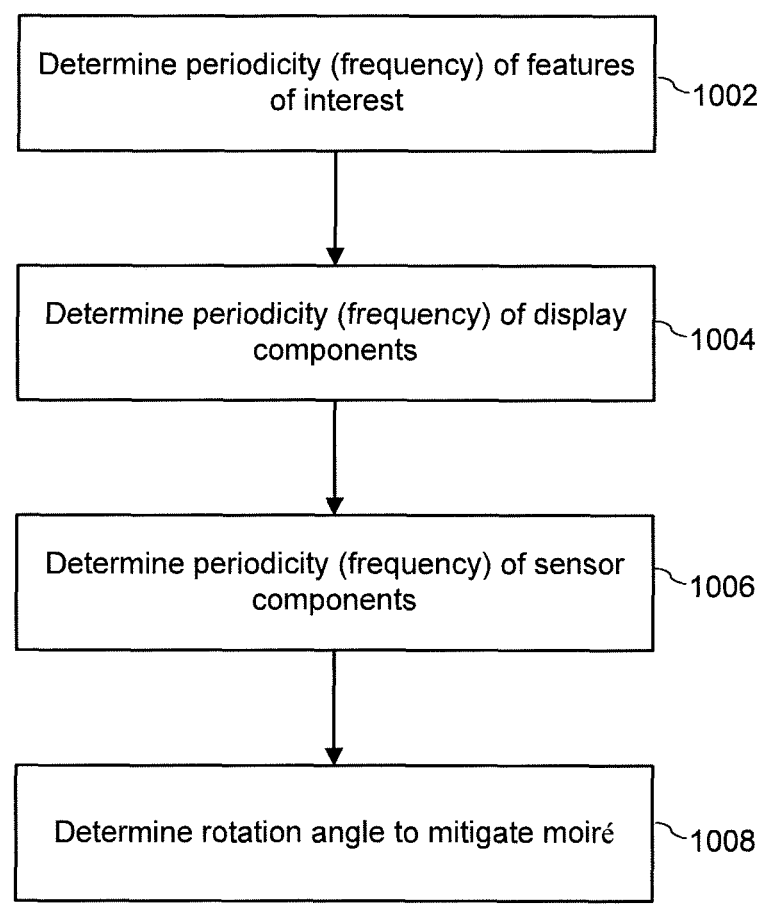
FIG. 10 illustrates a method of making an optical sensor for integration under a display, which mitigates moiré effects.

FIG. 10 illustrates a method of making an optical sensor for mounting under a display that incorporates an angle of rotation to mitigate potential moiré effects. In step 1002, the periodicity or frequency of features of interest are determined. For example, in the case of a fingerprint sensor, the frequency of spatial information of a finger are determined. Such spatial information may correspond to features such as ridges and valleys, minutia, pores and the like.

In step 1004, the periodicity or frequency of display components is determined. Such components may include pixels, sub-pixels and subsets or supersets thereof as well as other components such as electrodes, liquid crystal elements, and/or color filters to name a few.

In step 1006, the periodicity or frequency of sensor components are determined. These components will typically include pitch and frequency of individual sensing elements of a sensor array. If an optical element is employed, such as a collimator, the periodicity or frequency of individual optical elements (e.g., distance between apertures) may also be considered.

In step 1008, an appropriate angle of rotation is determined. The angle of rotation will depend on the analysis of the frequencies of the sensor and display and resulting moiré pattern. If the moiré pattern has a frequency on the same order of magnitude as the features of interest, the sensor is rotated at a selected angle sufficient to mitigate the moiré effect (e.g., such that the moiré pattern has a frequency an order of magnitude greater or less than that of the features of interest.)

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments of this invention are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electronic device for imaging a biometric object having structural features of interest, comprising:
   a display including rows of pixel elements, the rows of pixel elements being parallel to a first primary direction along a first axis; and
   an optical sensor disposed underneath the display, the optical sensor being parallel to a second primary direction along a second axis,
   wherein the second axis has an angle relative the first axis and wherein the angle adjusts a moiré pattern frequency outside of a frequency range corresponding to the structural features of interest to reduce moiré effect on images when imaging the biometric.

2. The electronic device of claim 1, wherein the biometric object is a finger and the frequency range of the structural features of interest corresponds to a frequency of ridges and valleys.

3. The electronic device of claim 1, wherein the angle is between 20 and 30 degrees.

4. The electronic device of claim 1, wherein the angle is between 26 and 27 degrees.

5. The electronic device of claim 1, wherein the optical sensor includes an optical element having rows of apertures and a sensor array having rows of sensing elements, the rows of apertures and rows of sensing elements being parallel to the second axis.

6. The electronic device of claim 1, wherein the optical sensor includes an optical element having rows of apertures and a sensor array having rows of sensing elements, the rows of apertures being parallel to the first axis and the rows of sensing elements being parallel to the second axis.

7. The electronic device of claim 1, wherein the optical sensor includes an optical element having rows of apertures and a sensor array having rows of sensing elements, the rows of apertures being parallel to the second axis and the rows of sensing elements being parallel to the first axis.

8. The electronic device of claim 1, wherein the optical sensor includes an array of sensing elements mounted on a die, the die having a primary axis parallel to the first axis and the array of sensing elements having a primary axis parallel to the second axis.

9. An electronic device, comprising:
   a display having rows of pixel elements parallel to a first primary axis; and
   an optical sensor having rows of sensing elements parallel to a second primary axis, the optical sensor configured to image a fingerprint,
   wherein the optical sensor is disposed underneath the display and oriented such that the second primary axis is rotated relative to the first primary axis at an angle θ, the angle θ being sufficient to reduce moiré effect on images when imaging the fingerprint.

10. The electronic device of claim 9, wherein the angle θ is sufficient to reduce a pattern of the moiré effect by an order of magnitude as compared to a non-rotated optical sensor.

11. The electronic device of claim 9, wherein the rows of sensing elements are disposed on a die, the die having a third primary axis parallel to the first primary axis and the rows of sensing elements being parallel to the second primary axis.

12. The electronic device of claim 9, wherein the angle θ is between 20 and 30 degrees.

13. The electronic device of claim 9, wherein the angle θ is 27 degrees.

14. The electronic device of claim 9, wherein the optical sensor further comprises a collimator and wherein the optical sensor is further orientated to reduce moiré effect on images caused by openings in the collimator.

15. A method for determining an angle to mount an optical sensor relative to a display to mitigate moiré patterns, comprising:
   determining a frequency of components of the display;
   determining a frequency of components of the optical sensor;
   determining a frequency of moiré patterns reaching the optical sensor when mounted below the display; and
   determining the angle based on the frequency of the components of the display and the frequency of the components of the sensor, wherein the angle adjusts the frequency of the moiré patterns to reduce moiré effect on images when imaging a biometric.

16. The method of claim 15, further comprising:
determining a frequency of features of interest, the features of interest corresponding to structural features of an input object;
wherein the step of determining the angle includes selecting the angle to adjust the frequency of moiré patterns above or below the frequency of the features of interest.

17. The method of claim 16, wherein the step of determining the angle includes selecting the angle such that the frequency of moiré patterns are an order of magnitude higher or lower than the frequency of features of interest.

18. The method of claim 15, wherein the angle is between 25 and 30 degrees.

19. The method of claim 15, wherein the step of determining the frequency of components of the display further comprises determining a frequency of pixels and sub-pixels.

20. The method of claim 19 wherein the step of determining the frequency of components of the display further comprises determining a frequency of electrodes.

* * * * *